United States Patent [19]

Brundrett

[11] Patent Number: 5,348,122

[45] Date of Patent: Sep. 20, 1994

[54] SLIDING BACK LEG BRAKE

[75] Inventor: Robert L. Brundrett, Troy, Ohio

[73] Assignee: The B. F. Goodrich Company, Akron, Ohio

[21] Appl. No.: 12,019

[22] Filed: Feb. 1, 1993

[51] Int. Cl.$^5$ .................. F16D 55/36; F16D 55/40
[52] U.S. Cl. .................. 188/71.5; 188/18 A; 188/72.4; 188/73.31; 188/366; 188/106 P; 188/72.3
[58] Field of Search .................. 188/18 A, 71.5, 72.3, 188/216, 366, 367, 368, 72.4, 71.1, 72.5, 264 G, 71.8, 196 R, 106 P, 71.4, 73.47, 73.43, 73.31; 192/70.2, 111 A, 70.16, 70.19, 70.21; 244/111, 110 H, 110 A

[56] References Cited

U.S. PATENT DOCUMENTS

| | | |
|---|---|---|
| 2,671,532 | 3/1954 | Du Bois . |
| 2,925,889 | 2/1960 | Albright . |
| 2,992,705 | 7/1961 | Chisnell et al. . |
| 3,038,559 | 6/1962 | Hirzel . |
| 3,156,321 | 11/1964 | Deyerling et al. . |
| 3,301,357 | 1/1967 | Cussons et al. . |
| 3,480,115 | 11/1969 | Lallemant ........................ 188/71.5 |
| 3,951,239 | 4/1976 | Newstead ........................ 188/72.4 X |
| 3,977,631 | 8/1976 | Jenny ............................. 188/71.5 X |
| 4,090,590 | 5/1978 | Karasudani et al. ............... 188/72.5 |
| 4,117,912 | 10/1978 | Ruppe, Jr. ....................... 188/71.5 X |
| 4,494,630 | 1/1985 | Stoka et al. ..................... 188/72.5 X |
| 4,529,067 | 7/1985 | Scott ............................. 188/71.5 X |
| 4,614,254 | 9/1986 | Mery et al. ...................... 188/71.5 |
| 4,844,206 | 7/1989 | Casey ............................ 188/71.5 X |
| 5,205,382 | 4/1993 | Edminsten ........................ 188/71.5 |

FOREIGN PATENT DOCUMENTS 403500  6/1966  Switzerland ........................ 188/71.5

OTHER PUBLICATIONS

Drawing –B. F. Goodrich 757 Carbon Brake (no date).

Primary Examiner—Douglas C. Butler
Attorney, Agent, or Firm—David M. Ronyak; Don W. Bulson

[57] ABSTRACT

A brake and wheel assembly wherein the available piston stroke for a given envelope can be significantly increased to provide greater brake life between overhauls. The wheel and brake assembly is characterized by a fluid actuated back leg structure which allows a disk pack to be compressed and adjusted not only from its brake head side as is conventional but also from its wheel side. As the brake wears, the back leg structure draws the wheel side of the disk pack toward the brake head while the brake actuator piston or pistons push the disk pack in the wheel direction.

17 Claims, 1 Drawing Sheet

SLIDING BACK LEG BRAKE

The invention herein described relates generally to a wheel and brake assembly and especially to one that is useful in landing gear for aircraft.

BACKGROUND

In the aircraft wheel and brake art, space considerations influence to a large extent the operation and construction of the brake. The brake is usually located interiorly of the wheel with the available envelope for the brake limited at one side by the aircraft wheel structure and at the other side by the aircraft landing gear strut. This limited envelope places limits on the piston stroke of the brake's fluid actuator and, consequently, brake life. The amount of disk wear that can be tolerated before the brake must be overhauled is dependent on the available piston stroke.

Known in the prior art are aircraft wheel and brake assemblies including a non-rotatable wheel support, a wheel mounted to the wheel support for rotation, and a disk pack having front and rear axial ends and alternating rotor and stator disks mounted with respect to the wheel support and wheel for relative axial movement. Each rotor disk is coupled to the wheel for rotation therewith and each stator disk is coupled to the wheel support against rotation. A back plate is located at the rear end of the disk pack and a brake head is located at the front end. The brake head houses a plurality of actuator pistons that extend to compress the disk pack against the back plate. Torque is taken out by the stator disks through a static torque tube or the like. As the disks wear, the stroke of the actuator pistons takes up the space created by the reduced axial thickness of the disk pack. The take up, however, is limited by the available piston stroke. Before the piston stroke is fully taken up, the brake must be overhauled to prevent loss of brake torque.

SUMMARY OF THE INVENTION

The present invention provides a brake and wheel assembly wherein the available piston stroke for a given envelope can be significantly increased to provide greater brake life between overhauls. The wheel and brake assembly are characterized by a fluid actuated back leg structure which allows a disk pack to be compressed and adjusted not only from its brake head side as is conventional but also from its wheel side. As the brake wears, the back leg structure draws the wheel side of the disk pack toward the brake head while the brake actuator piston or pistons push the disk pack in the wheel direction.

In relation to the prior art wheel and brake assemblies of the above described type, the back plate thereof is replaced by the back leg structure which is actuated by one or more fluid pressure operated retractors that have strokes which are at least partially axially coextensive with the extension strokes of the actuator pistons. As a result, the available piston stroke can be increased up to twice the stroke of the actuator pistons and, consequently, the brake life between overhauls can be significantly increased. Moreover, the centroid of the disk pack can be maintained in essentially the same axial position within the brake, as may be desired.

With the foregoing in mind, a wheel and brake assembly for aircraft landing gear, according to the invention, generally comprises a non-rotatable wheel support; a wheel mounted to the wheel support for rotation: a disk pack having front and rear axial ends and including alternating rotor and stator disks mounted with respect to the wheel support and wheel for relative axial movement, each rotor disk being coupled to the wheel for rotation therewith and each stator disk being coupled to the wheel support against rotation; a back leg structure mounted for axial movement relative to the wheel support, the back leg structure having a back pressure member for applying force to the back end of the disk pack and an axial extension extending axially from the back pressure member to the front end of the disk pack; a front pressure member mounted for axial movement relative to the wheel support for applying force to the front end of the disk pack; and fluid actuator means located at the front end of the disk pack and connected to the front pressure member and the axial extension for urging the front pressure member rearwardly and the back pressure member forwardly to squeeze the rotor and stator disks together thereby to apply braking force to the wheel.

According to a preferred embodiment, the back leg structure is in the form of a sliding torque tube back leg having an axially extending hub portion forming the axial extension and a radial flange portion forming the back pressure member. The stator disks are splined to the sliding back leg hub which in turn is splined to a torque tube or equivalent structure, whereby brake torque is taken out by the stator disks through the sliding back leg to the torque tube. During operation of the brake, the sliding back leg is urged forwardly by a plurality of retractor pistons which are spaced around a piston housing at the front end of the disk pack in alternating relationship with actuator pistons that urge the front pressure member rearwardly. The strokes of the retractor and actuator pistons are at least partially axially coextensive for a corresponding increase in the available piston stroke for a given envelope size.

Although the invention has primary application in aircraft landing gear and is chiefly described in this context, those skilled in the art will appreciate that the invention may have other applications as well. In more general terms, the invention provides a wheel and brake assembly comprising a non-rotatable wheel support; a wheel mounted to said wheel support for rotation; an arrangement of axially alternating rotary and stationary friction brake elements mounted with respect to the wheel support and wheel for relative axial movement, each rotary brake element being coupled to the wheel for rotation therewith and each stationary brake element being coupled to the wheel support against rotation; axially opposed front and back pressure members mounted for axial movement relative to the wheel for applying squeeze forces to front and rear axial ends of the arrangement of brake elements; and fluid actuator means located at the front end of the arrangement of brake elements for urging the from and back pressure members towards one another to squeeze the brake elements together thereby to apply braking force to the wheel, the fluid actuator means including a rearwardly extendable member connected to the front pressure member and a forwardly extendable member connected to the back pressure member by linking structure extending axially coextensively with the arrangement of brake elements.

The invention also is characterized by a brake assembly comprising a disk pack having front and rear axial ends and including alternating rotor and stator disks mountable with respect to a wheel support and a wheel for relative axial movement, each rotor disk being adapted for coupling to the wheel for rotation therewith and each stator disk being adapted for coupling to the wheel support against rotation; an axially movable back leg structure having a back pressure member for applying force to the back end of the disk pack and an axial extension extending axially from the back pressure member to the front end of the disk pack; an axially movable front pressure member for applying force to the front end of the disk pack, and fluid actuator means located at the front end of the disk pack and connected to the front pressure member and the axial extension for urging the front pressure member rearwardly and the back pressure member forwardly to squeeze the rotor and stator disks together thereby to apply braking force to the wheel. As is preferred, the fluid actuator means includes, at the front end of the disk pack, at least one extender piston connected to the front pressure member and at least one retractor piston connected to the axial extension of the back leg structure, the extender and retractor pistons having stokes that are at least partially axially coextensive. Also, the back leg structure preferably includes a sliding torque tube back leg having an axially extending hub portion forming said axial extension and a radial flange portion forming the back pressure member, and the stator disks are splined to the hub portion of the back leg structure.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figure 1:
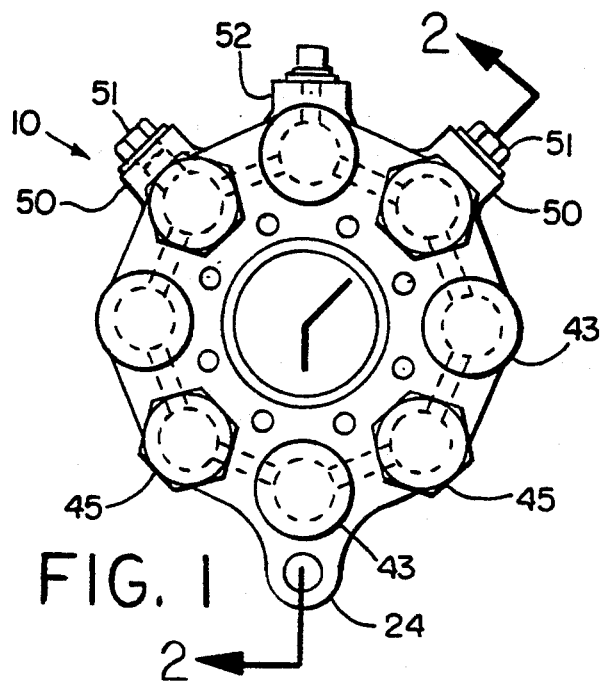
FIG. 1 is an end view of a wheel and brake assembly according to the invention.
Figure 3:
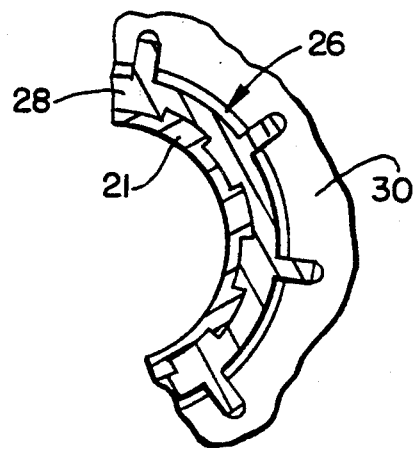
FIG. 3 is a partial sectional view taken along the line 3—3 of FIG. 2.
Figure 2:
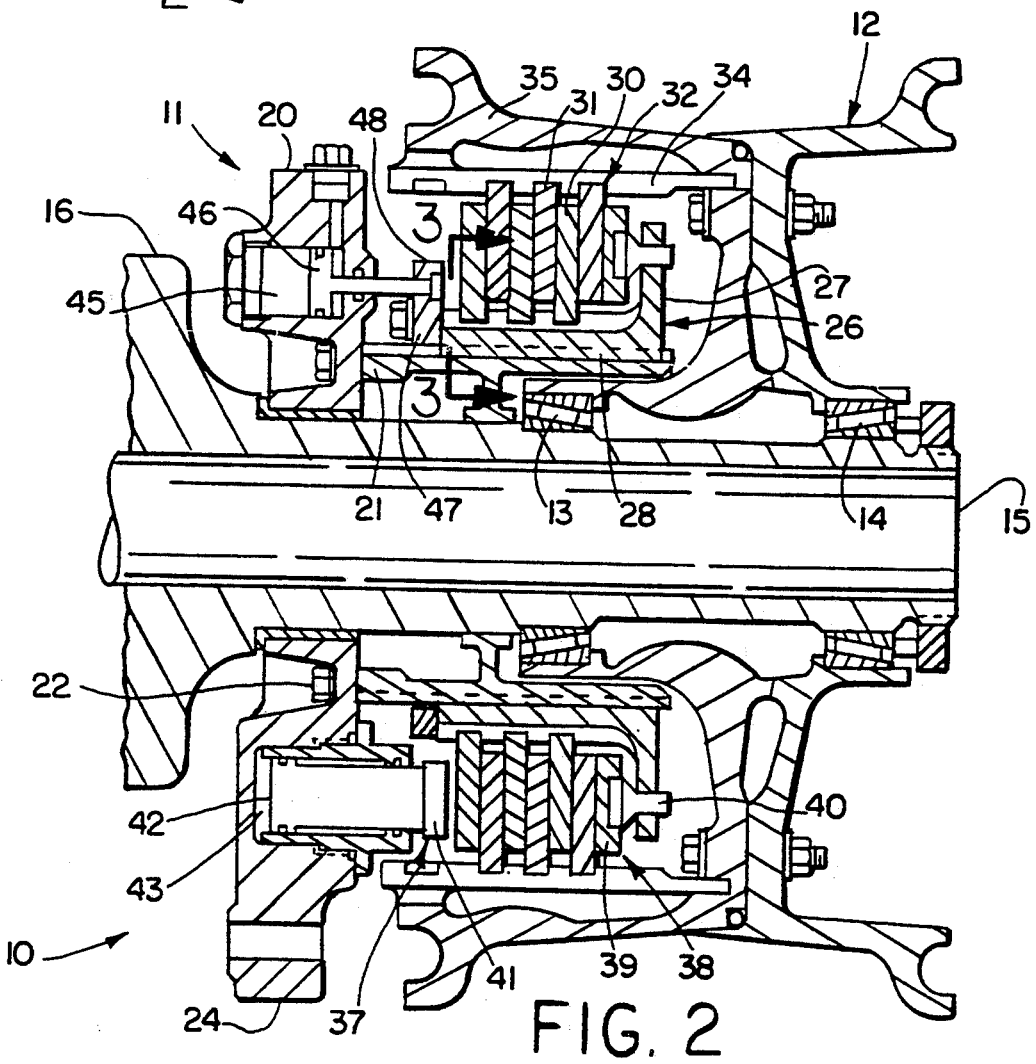
FIG. 2 is a sectional view of the wheel and brake assembly taken substantially along the line 2—2 of FIG. 1.

Referring now in detail to the drawings and initially to FIGS. 1 and 2, a wheel and brake assembly according to the invention is generally indicated at 10. The assembly 10 generally comprises a brake 11 and an aircraft wheel 12 which is supported for rotation by bearings 13 and 14 on a stationary axle 15. The axle 15 extends laterally from supporting structure such as an aircraft landing gear strut 16 only partially shown in FIG. 2.

The brake 11 includes a brake head 20 and a torque tube 21 which is attached to the brake head 20 by bolt fasteners 22. The brake head 20 is telescoped over the axle 15 and has a torque arm lug 24 to which a torque arm (not shown) can be attached. The torque arm is connected between the torque arm lug and the strut to prevent the brake head from rotating around the axle along with the wheel when the brake is actuated. Although the invention is being illustrated in the context of a torque lug type brake, the principles of the invention may be applied to other types of brakes such as to a brake of the flange mounted type as will be appreciated by those skilled in the art.

For purposes of the description herein, the wheel side of the assembly 10 shown at the right in FIG. 2 is herein arbitrarily referred to as the rear or rearward end thereof and, conversely, the brake side of the assembly 10 shown at the left in FIG. 2 is herein referred to as the front or forward end of the assembly. The reference to front and rear, forward or backward, etc. is not intended to imply a specific orientation of the wheel and brake assembly relative to any surrounding environment. Instead, these directional terms are intended to facilitate a description of the interrelationship between the several components of the brake and wheel assembly and their function.

The brake 11 further includes a sliding torque tube back leg 26 which has a radial flange portion 27 and a central hub portion 28 which extends forwardly from the flange portion. The hub portion 28 is splined to the torque tube 21 for axial sliding movement on the torque tube 21 while being rotatable therewith.

The back leg hub 28 is surrounded by stationary brake elements 30 and rotary brake elements 31 which are interleaved. The stationary and rotary brake elements are in the form of stator and rotor disks, and the interleaved arrangement thereof is commonly referred to as a disk pack or heat pack, the same being designated by reference numeral 32. The stator disks 30 are splined to the back leg hub 28 for axial movement while being coupled to the back leg 26 for rotation therewith. The rotor disks 31 are splined to a number of rotor drive keys 34 that are secured to the wheel 12 interiorly of the wheel's rim 35. As is conventional, the drive keys 34 are spaced around the circumference of the rim 35 to permit axial movement of the rotor disks 31 while being coupled to the wheel 12 for rotation therewith.

The interleaved stator and rotor disks 30 and 31 are located between front and back pressure members 37 and 38. In the illustrated embodiment, the back pressure member 38 is formed by the radial flange 27 of the back leg 26 which carries thereon an annular disk 39 for engaging the rear end of the disk pack. The disk 39 that is attached to the radial flange 27 of the back leg 26 by several torque pucks 40. The torque pucks 40 preferably have the stems thereof loosely fitted in holes in the radial flange 27 to permit some swiveling movement thereof. In a modified arrangement the radial flange could be configured to engage directly the disk pack.

The front pressure member 37, in the illustrated brake 11, is formed by one or more disk engaging means and, preferably, insulator pads 41 carried by respective actuator pistons 42 at the rear ends of the rearwardly extending piston rods thereof. The actuator pistons 42, also herein referred to as extender pistons, are housed for axial movement within respective actuator cylinders 43 in the brake head 20 in a circular arrangement concentric with the rotation axis of the wheel 12. As shown in FIG. 1, there are four circumferentially equally spaced apart actuator cylinders 43 having respective pistons 42. As is conventional, the insulator pads 41 function not only to transmit force but also to insulate the hydraulic fluid in the brake cylinders 43 from the heat of the disk pack when braking force is being applied.

The brake head 20 also includes at least one and preferably several retractor cylinders 45 that are circumferentially equally spaced apart in alternating relationship with the actuator cylinders 43. Each retractor cylinder 45 contains a retractor piston 46 that has a rearwardly extending rod attached to the front end of the back leg 26 by an attachment ring 47 at radially outwardly protruding ears 48 thereof. As will be appreciated, the central hub portion 28 functions as a linkage that extends axially coextensively with the disk pack 32 between the retractor pistons 46 and the radial flange portion 27 on which the back pressure member 38 is carried.

Both sets of actuator and retractor cylinders 43 and 45 are joined by internal passages in the brake head 20 to redundant ports 50. Hydraulic fluid pressure may be supplied via a fluid line connected to either one of the ports 50 to actuate the brake while the other port normally will be closed by a plug 51. The illustrated brake head is also provided with a bleed port 52, as is conventional.

When hydraulic pressure is supplied, the actuator pistons 42 extend to compress the disk pack 32 from the actuator housing side while the retractor pistons 46 retract to pull the back leg 26 forwardly toward the actuator housing with an opposite and preferably equal force. The resultant brake torque will be taken out by the stator disks 30 through the back leg 26 which is splined to the torque tube 21.

As indicated, an equal and opposite force is applied to the disk pack 32. In the illustrated embodiment, this arises from the use of an equal number of actuator and retractor piston-cylinder assemblies that are of essentially equal size. Of course, different arrangements may be utilized although it is desirable to provide for equal application of force thereby to maintain the centroid of the disk pack approximately at the same axial position within the brake.

As the brake wears the back leg 26 will be pulled by the retractor pistons 42 toward the brake head 20 while the actuator pistons continue to extend and adjust the running clearance of the brake in a conventional manner. The back leg allows the disk pack to be compressed and adjusted from the wheel side of the disk pack as well as from the brake head side of the disk pack. The total available brake stroke will then be the sum of the translation or strokes of the retractor pistons and the actuator pistons which are at least partially axially coextensive. This allows the available piston stroke to be increased up to twice the available piston stroke when compared to the piston extension for conventional brakes employing a fixed back plate. That is, the available piston or take-up stroke of the brake may be twice the available stroke of the actuator pistons when the retractor pistons have an available stroke that is the same and axially coextensive with the available stroke of the actuator pistons over the full axial extent thereof. Accordingly, the brake life per overhaul may be doubled.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A wheel and brake assembly for aircraft landing gear comprising
   a non-rotatable wheel support including an axle,
   a wheel mounted to said wheel support for rotation,
   a torque tube mounted on said axle,
   a disk pack having front and rear axial ends and including alternating rotor and stator disks mounted with respect to said wheel support and wheel for relative axial movement, each rotor disk being coupled to said wheel for rotation therewith and each stator disk being coupled to said wheel support against rotation,
   a back leg structure mounted for axial movement relative to said wheel support, said back leg structure having a back pressure member for applying force to the back end of said disk pack and an axial extension extending axially from said back pressure member to the front end of said disk pack, said back leg structure including a sliding torque tube back leg having an axially extending hub portion forming said axial extension and radial flange portion extending radially outwardly from said hub portion and forming said back pressure member, said stator disks being splined to said hub portion of said back leg structure, and said hub portion of said back leg structure being splined to said torque tube,
   a front pressure member mounted for axial movement relative to said wheel support for applying force to the front end of said disk pack, and
   fluid actuator means located at the front end of said disk pack and connected to said front pressure member and said axial extension for urging said front pressure member rearwardly and said back pressure member forwardly to squeeze the rotor and stator disks together thereby to apply braking force to the wheel.

2. A wheel and brake assembly, for aircraft landing gear comprising
   a non-rotatable wheel support,
   a wheel mounted to said wheel support for rotation,
   a disk pack having front and rear axial ends and including alternating rotor and stator disks mounted with respect to said wheel support and wheel for relative axial movement, each rotor disk being coupled to said wheel for rotation therewith and each stator disk being coupled to said wheel support against rotation,
   a back leg structure mounted for axial movement relative to said wheel support, said back leg structure having a back pressure member for applying force to the back end of said disk pack and an axial extension extending axially from said back pressure member to the front end of said disk pack,
   a front pressure member mounted for axial movement relative to said wheel support for applying force to the front end of said disk pack, and
   fluid actuator means located at the front end of said disk pack and connected to said front pressure member and said axial extension for urging said front pressure member rearwardly and said back pressure member forwardly to squeeze the rotor and stator disk together thereby to apply braking force to the wheel, said fluid actuator means including, at the front end of said disk pack, at least one extender piston connected to said front pressure member and at least one retractor piston connected to said axial extension of said back leg structure, said extender and retractor pistons having strokes that are at least partially axially coextensive.

3. A wheel and brake assembly for aircraft landing gear comprising
   a non-rotatable wheel support, a wheel mounted to said wheel support for rotation, a disk back having front and rear axial ends and including alternating rotor and stator disks mounted with respect to said wheel support and wheel for relative axial movement, each rotor disk being coupled to said wheel for rotation therewith and each stator disk being coupled to said wheel support against rotation, a back leg structure mounted for axial movement relative to said wheel support, said back leg structure having a back pressure member for applying force to the back end of said disk pack and an axial extension extending axially from said back pressure member to the front end of said disk pack, a front pressure member mounted for axial movement relative to said wheel support for applying force to the front end of said disk pack and fluid actuator means located at the front end of said disk pack and connected to said front pressure member and said axial extension for urging said front pressure member rearwardly and said back pressure member forwardly to squeeze the rotor and stator disks together thereby to apply braking force to the wheel, said fluid actuator means including, at the front end of said disk pack, a plurality of extender pistons connected to said front pressure member and a plurality of retractor pistons connected to said axial extension of said back leg structure, said extender and retractor pistons being circumferentially spaced apart in alternating relationship with respect to one another.

4. A wheel and brake assembly as set forth in claim 3, wherein said extender pistons have rearwardly extending piston rods, and said front pressure member includes respective insulator pads on rear ends of said piston rods.

5. A wheel and brake assembly as set forth in claim 3 wherein said fluid actuator means includes respective cylinders for said extender and retractor pistons commonly disposed in a brake head at the front end of said disk pack.

6. A wheel and brake assembly as set forth in claim 5, wherein said brake head includes fluid passages for supplying pressure fluid to said cylinders to effect simultaneous extension of said extender pistons and retraction of said retractor pistons.

7. A wheel and brake assembly as set forth in claim 3, wherein the strokes of said extender and retractor pistons are at least partially coextensive.

8. A wheel and brake assembly comprising a non-rotatable wheel support, a wheel mounted to said wheel support for rotation, an arrangement of axially alternating rotary and stationary friction brake elements mounted with respect to said wheel support and wheel for relative axial movement, each rotary brake element being coupled to said wheel for rotation therewith and each stationary brake element being coupled to said wheel support against rotation, axially opposed front and back pressure members mounted for axial movement relative to said wheel for applying squeeze forces to front and back ends of said arrangement of brake elements, and fluid actuator means located at the front end of said arrangement of brake elements for urging said front and back pressure members towards one another to squeeze the brake elements together thereby to apply braking force to said wheel, said fluid actuator means including a rearwardly extendable member connected to said front pressure member and a forwardly extendable member connected to said back pressure member by linkage means extending axially coextensively with said arrangement of brake elements.

9. A wheel and brake assembly as set forth in claim 8, wherein the strokes of said forwardly and rearwardly extendable members are at least partially axially coextensive.

10. A wheel and brake assembly as set forth in claim 8, wherein said fluid actuator means includes, at the front end of said arrangement of friction brake elements, at least one extender piston connected to said front pressure member and at least one retractor piston connected to said back pressure member, said extender and retractor pistons having strokes that are at least partially axially coextensive.

11. A wheel and brake assembly as set forth in claim 8 wherein said fluid actuator means includes, at the front end of said arrangement of friction brake elements, a plurality of extender pistons connected to said front pressure member and a plurality of retractor pistons connected to said back pressure member, said extender and retractor pistons being circumferentially spaced apart in alternating relationship with respect to one another.

12. A wheel and brake assembly as set forth in claim 11, wherein said extender pistons have rearwardly extending piston rods, and said front pressure member includes respective insulator pads on the ends of said piston rods.

13. A wheel and brake assembly as set forth in claim 11, wherein said fluid actuator means includes respective cylinders for said extender and retractor pistons commonly disposed in a brake head at the front end of said arrangement of friction brake elements.

14. A wheel and brake assembly as set forth in claim 13, wherein said brake head includes fluid passages for supplying pressure fluid to said cylinders to effect simultaneous extension of said extender pistons and retraction of said retractor pistons.

15. A brake assembly comprising a disk pack having front and rear axial ends and including alternating rotor and stator disks mountable with respect to a wheel support and a wheel for relative axial movement, each rotor disk being adapted for coupling to the wheel for rotation therewith and each stator disk being adapted for coupling to the wheel support against rotation, an axially movable back leg structure having a back pressure member for applying force to the back end of said disk pack and an axial extension extending axially from said back pressure member to the front end of said disk pack, an axially movable front pressure member for applying force to the front end of said disk pack, and fluid actuator means located at the front end of said disk pack and connected to said front pressure member and said axial extension for urging said front pressure member rearwardly and said back pressure member forwardly to squeeze the rotor and stator disks together thereby to apply braking force to the wheel, said fluid actuator means including at the front end of said disk pack, at least one extender piston connected to said front pressure member and at least one retractor piston connected to said axial extension of said back leg structure.

16. A wheel and brake assembly as set forth in claim 15, wherein said extender and retractor pistons strokes that are at least partially axially coextensive.

17. A wheel and brake assembly as set forth in claim 15, wherein said back leg structure includes a sliding torque tube back leg having an axially extending hub portion forming said axial extension and a radial flange portion forming said back pressure member, and said stator disks are splined to said hub portion of said back leg structure.

* * * * *